United States Patent
Fleming et al.

(10) Patent No.: US 7,267,330 B1
(45) Date of Patent: Sep. 11, 2007

(54) SPLIT RING SEAL

(75) Inventors: Phillip Bradley Fleming, Keller, TX (US); Donald Clifton Hoyle, Grand Prairie, TX (US)

(73) Assignee: Jaeger Products, Inc., Houston, TX (US)

( * ) Notice: Subject to any disclaimer, the term of this patent is extended or adjusted under 35 U.S.C. 154(b) by 238 days.

(21) Appl. No.: 11/175,667

(22) Filed: Jul. 6, 2005

(51) Int. Cl.
*B01F 3/04* (2006.01)
*F16J 15/02* (2006.01)

(52) U.S. Cl. ............................ 261/114.1; 261/114.5; 277/315; 277/631

(58) Field of Classification Search .. 261/114.1–114.5, 261/108; 267/1.5; 277/315, 627, 631, 910
See application file for complete search history.

(56) References Cited

U.S. PATENT DOCUMENTS

| | | | | |
|---|---|---|---|---|
| 1,361,672 A | * | 12/1920 | Blair | 277/490 |
| 2,241,114 A | * | 5/1941 | Brunjes | 261/114.1 |
| 2,241,370 A | * | 5/1941 | Armstrong | 261/114.1 |
| 2,807,451 A | * | 9/1957 | Kuhni et al. | 261/114.1 |
| 2,889,018 A | * | 6/1959 | Swan | 52/246 |
| 2,951,691 A | | 9/1960 | Nutter | |
| 3,039,751 A | * | 6/1962 | Versluis | 261/114.1 |
| 3,053,520 A | * | 9/1962 | Streuber | 261/114.5 |
| 3,094,575 A | * | 6/1963 | Peterson | 261/114.1 |
| 3,097,855 A | * | 7/1963 | Allen | 277/584 |
| 3,179,389 A | | 4/1965 | Nutter | |
| 3,287,004 A | | 11/1966 | Nutter | |
| 3,926,741 A | * | 12/1975 | Bertsch | 202/269 |
| 4,361,469 A | | 11/1982 | Trutna | |
| 4,589,666 A | * | 5/1986 | Halling | 277/631 |
| 5,695,548 A | | 12/1997 | Trutna | |
| 7,055,810 B2 | * | 6/2006 | Gage | 261/114.1 |
| 2006/0085060 A1 | * | 4/2006 | Campbell | 623/1.26 |

OTHER PUBLICATIONS

"Package Trays for Pipe-Size Process Vessels" Bulletin PT-1 of Nutter Engineering, six pages, no discernible date.
"A Full Spectrum of Tower Internals" Bulletin N-3 of Nutter Engineering, p. 7 plus the front and back covers, no discernible date.

* cited by examiner

*Primary Examiner*—Scott Bushey
(74) *Attorney, Agent, or Firm*—Leydig, Voit & Mayer, Ltd.

(57) ABSTRACT

A split ring seal having a structured split formed with first and second overlapping leaves, movable between a compressed state and an expanded state, and having a first bore through the first leaf and a second bore through the second leaf such that, in the compressed state, the first and second bores are mutually aligned. A method of installing one or more packing trays in a process tower comprising providing such a split ring seal carried by one or more packing trays, locking each split ring seal in its compressed state with a pin through the overlapping leaf bores, placing the packing trays in the process tower and removing the pin to allow the split ring seals to expand and seal to the process tower.

8 Claims, 3 Drawing Sheets

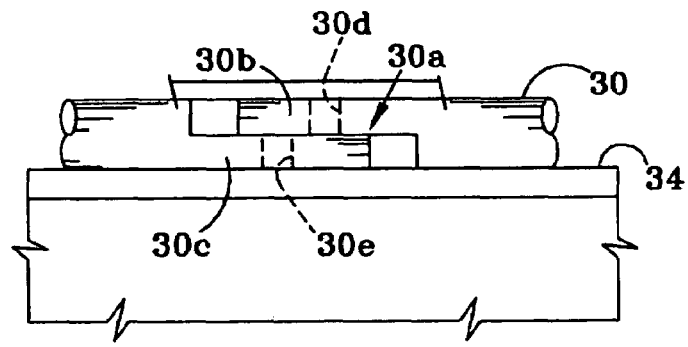
FIG. 8
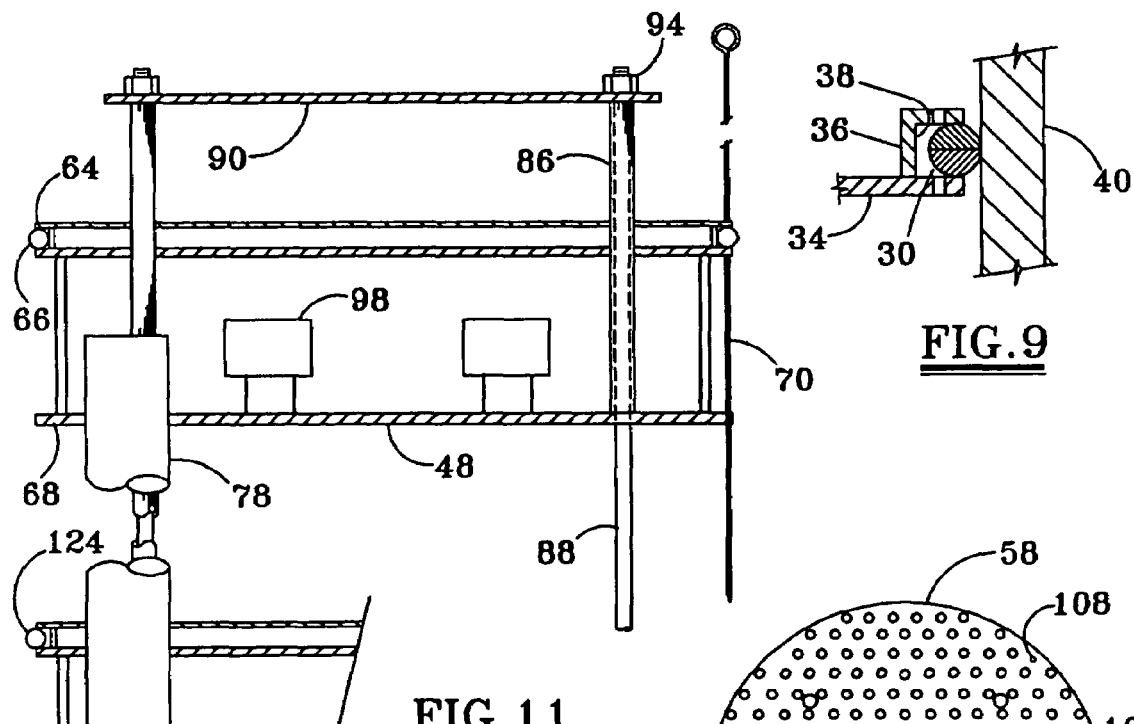
FIG. 11
FIG. 9
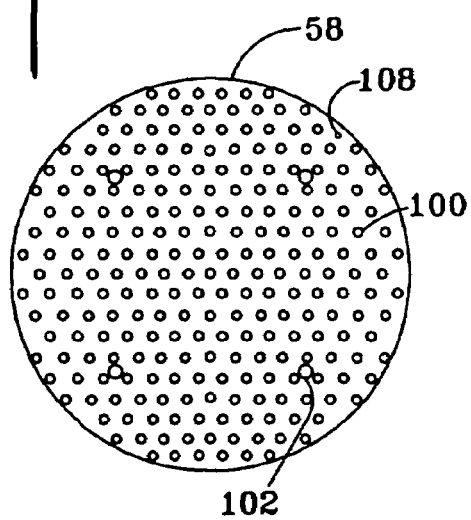
FIG. 14

SPLIT RING SEAL

BACKGROUND OF THE INVENTION

1. Field of the Invention

The present invention pertains to techniques for sealing devices to the interior wall of a surrounding chamber. More particularly, the present invention relates to seals used in conjunction with tray packings in process chambers.

2. Description of Related Art

Many commercial and chemical processes involve mass transfer or heat exchange, and utilize packed columns or chambers to carry out the steps. Such processes can include distillation, absorption and desorption, fractionating, gas cleaning and drying, scrubbing and various biological processes, for example. Two fluids, usually a gas and a liquid, are intermingled within a chamber, typically as countercurrent flow streams wherein the two fluids move generally in opposite senses along the same flow axis.

The mass transfer rates and/or the reaction rates of the processes increase with increasing opportunities for the two fluids to interface with each other. Packing is generally included in exchange process columns to enhance the interaction between two fluids in the column, thereby increasing the efficiency of the process. There are different types of packing systems, depending on the packing elements and their arrangements in the transfer chamber. Structured packing systems generally include extended, structured packing elements that are arranged within the chamber. Random packing systems comprise generally small, individual packing elements that may be dumped into the exchange chamber in a random array. Tray-type systems include multiple packing sections, in which gas and liquid are made to contact, positioned in a vertical array. After interacting with the gas at one such packing section, liquid is passed by a down flow pipe, or downcomer, to a lower section for further contact with the gas, which is passing upwardly in the system.

U.S. Pat. No. 3,179,389 is directed to a tray-type system in which a plurality of fluid contact trays are assembled in a unit that is then inserted into a tower. The trays are thus positioned vertically spaced apart and horizontally oriented. Contact trays disclosed include multiple floating valves that allow gas or vapor to pass upwardly through the tray into contact with liquid on the tray. Each such tray carries a seal for engaging the inner surface of the tower to hold the liquid on the tray. A seal 10 of the type used is illustrated in FIG. 1. The ring seal 10 is a flat, resilient split ring metal seal having a gap 10a. As shown in FIG. 2, a tray deck 12 carries the ring seal 10 about the periphery of the tray in an appropriate groove 14 formed between the offset rim 12a of the tray and an underlying attached ring 16. In its relaxed, expanded state, the ring seal 10 has a greater outer diameter than the diameter of the inner surface of the wall of a process tower 18, as indicated in FIG. 2. The ring seal 10 is forced to a contracted state, reducing its diameter so that the seal passes further into the tray groove 14 to allow the tray 12 to be inserted into the tower 18. The ring seal 10 then engages the inner surface of the tower wall 18 to form a seal between the tray deck 12 and the tower wall, as indicated in FIG. 3. Although the gap 10a is lessened when the ring seal 10 is positioned within a tower 18 with a tray 12, the gap nevertheless remains open, preventing a complete seal around the periphery of the tray with the tower wall. Further, as the tray 12 is passed down into a tower 18, a ring seal of the type 10 may be further compressed by projections on the tower wall 18, which may not be necessarily smooth. There is a possibility that a flat metal ring seal of the type 10 may hang up on such a projection, interfering with the insertion of the tray 12 into the tower 18.

Another version of a known ring seal 20 is illustrated in FIG. 4. The resilient ring packing gland 20 is shown residing in a groove 22 of a tray 24 formed by a U-structure 26 about the periphery of the tray. The packing gland 20 is positioned within the groove 22 and the tray inserted within a tower wall 28. The packing gland 20 is a continuous gasket of fiberglass rope that is compressed between the groove 22 and the tower wall 28 to form a seal between the wall and the tray 24. As the tray 24 carrying the gasket 20 is lowered into the tower 28, the gasket is compressed locally by any projections encountered along the inner surface of the tower wall, allowing the gasket to slip be such projections. However, there still exists the possibility that the gasket 20, which has a generally rectangular cross section with a generally flat bottom, may hang up on such projections and even be pulled out of the groove 22 of the tray 24 by such projections.

It is advantageous and desirable to provide a packing tray ring seal that will seal completely around the periphery of the tray with no gaps, and that will pass along the interior surface of the tower wall without hanging up on projections or being dislodged by them. The present invention provides such a seal.

SUMMARY OF THE INVENTION

In the discussion of the invention it is understood that the term "packing tray" is not to be limited to bubble trays or any specific type of packing tray illustrated herein. The term "leaf and the plural "leaves" are used in the general sense of a part of something, here, part of a split ring such that two leaves of the split ring may be in mutual contact and slide one along the other, or simply pass by each other. Also, the term "pin" is used in the general sense of a piece of solid material used to hold fast two articles, here, locking the two leaves of a split ring against mutually relative movement.

The present invention provides a split ring seal comprising a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned. A pin may be selectively inserted through the mutually aligned first and second bores to lock the ring in the compressed state, and selectively removed from at least one of the first and second bores to allow the ring to expand.

According to the present invention, an improvement in a packing tray, for use in a process chamber wherein a gas flows generally upwardly and a liquid flows generally downwardly and wherein the gas and the liquid may interact, and carrying a split ring seal in a radially outwardly-facing groove for sealing the packing tray to an interior surface of the process chamber, comprises the split ring seal being according to the invention as described above and a pin that is selectively receivable within the first and second bores mutually aligned in the compressed state of the split ring seal to lock the ring in the compressed state, and is selectively removable to allow the ring to expand.

In a method of the invention, such a packing tray may be installed in such a process chamber wherein the improvement comprises providing the split ring seal of the invention and the pin as described above, moving the split ring seal to its compressed state and inserting the pin into the mutually aligned first and second bores of the split ring seal, inserting the packing tray into position within the process chamber, and removing the pin from at least one of the first and second bores of the split ring seal to allow the split ring seal to expand and seal to the interior surface of the process chamber.

According to the present invention, an improvement in apparatus, for use in a process chamber wherein a gas flows generally upwardly and a liquid flows generally downwardly and wherein the gas and the liquid may interact, and including multiple packing trays joined together in a cartridge with one or more of the packing trays carrying a split ring seal in a radially outwardly-facing groove for sealing the packing tray to an interior surface of the process chamber, comprises each such split ring seal being according to the invention as described above and a pin that is selectively receivable within the first and second bores mutually aligned in the compressed state of each such split ring seal to lock the ring in the compressed state, and is selectively removable to allow the ring to expand. Such apparatus may include multiple such cartridges and such a pin for each cartridge.

In a method of the invention, such apparatus, including one or more such cartridges, may be installed in such a process chamber wherein the improvement comprises providing the split ring seals of the invention and the one or more pins as described above, for each cartridge, moving each such split ring seal to its compressed state and inserting the respective pin into the mutually aligned first and second bores of each such split ring seal, inserting the cartridge into position within the process chamber, and removing the pin from at least one of the first and second bores of each such split ring seal to allow the split ring seal to expand and seal to the interior surface of the process chamber.

BRIEF DESCRIPTION OF THE DRAWINGS

These and other features, aspects, and advantages of the present invention will become more fully apparent from the following description, appended claims, and accompanying drawings in which:

FIG. 8 is a view similar to FIG. 7, but showing the locking pin removed and the split ring seal expanded;

FIG. 9 is a view similar to FIG. 6, but with the locking pin removed and the split ring seal expanded, sealing the tray to the interior surface of the process tower wall;

FIG. 11 is a fragmentary side elevation of portions of one of the packing tray cartridges of FIG. 10, with the locking pin partially removed;

FIG. 14 is a plan view of a perforated plate contained in one of the packing tray cartridges shown in FIG. 10.

DETAILED DESCRIPTION OF PREFERRED EMBODIMENT

Figure 1:
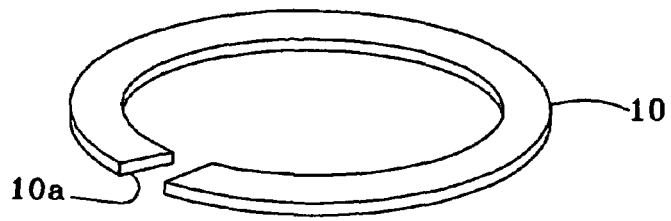
FIG. 1 is an isometric view of a flat, open type split ring seal known in the prior art.
Figure 2:
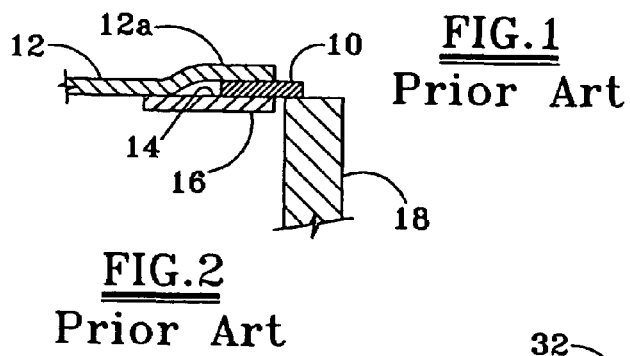
FIG. 2 is a fragmentary side elevation in cross section of the prior art split ring seal of FIG. 1 carried by a tray on the top of the wall of a process tower.
Figure 5:
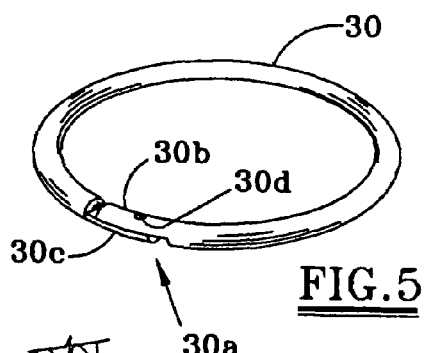
FIG. 5 is an isometric view of a split ring seal according to the present invention in the relaxed, expanded state.
Figure 3:
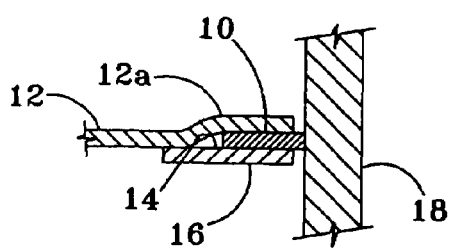
FIG. 3 is a view of the prior art similar to FIG. 2, with the prior art split ring seal compressed to fit within the wall of the process tower.
Figure 6:
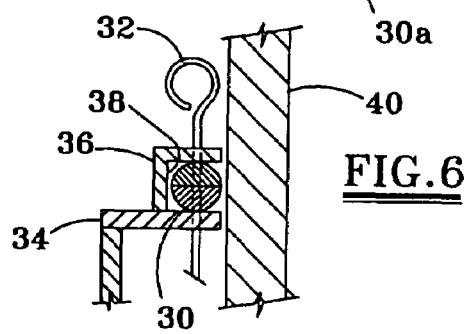
FIG. 6 is a fragmentary side elevation in partial section of the split ring seal of FIG. 5 carried by a tray and constrained by a locking pin, within the wall of a process tower.
Figure 4:
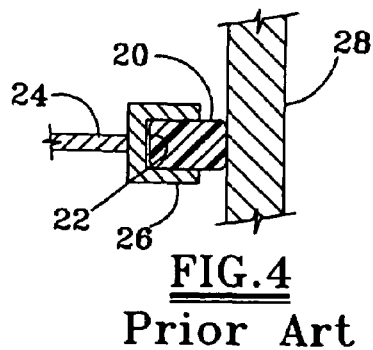
FIG. 4 is a fragmentary side elevation in cross section of a prior art ring packing gland carried by a tray within the wall of a process tower.
Figure 7:
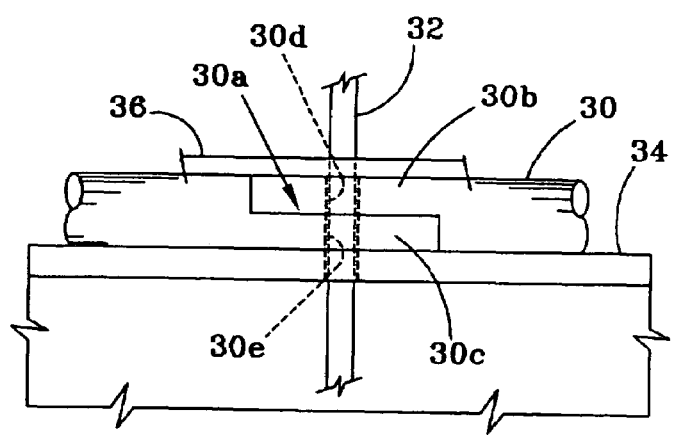
FIG. 7 is a fragmentary side elevation of the split ring seal and tray of FIG. 6, showing the overlap of the ring leaves in the compressed state.

A split ring seal 30 according to the present invention is shown in FIG. 5. The split ring 30 has a circular cross section (see FIG. 6) as opposed to the rectangular cross sections of the prior art rings 10 and 20. The ring 30 has a structured split shown generally at 30a. The split 30a is stepped to form two overlapping leaves 30b and 30c. The upper leaf 30b, as illustrated, has a flat bottom surface, and the lower leaf 30c, as illustrated, has a flat upper surface that is in contact with the lower surface of the upper leaf 30b. The split ring 30 is sufficiently resilient that it is movable between a relaxed, expanded state as shown in FIG. 5, and a compressed state as shown in FIGS. 6 and 7. A first bore 30d passes through the upper leaf 30b and a second bore 30c passes through the lower leaf 30c such that the two bores 30d and 30e are mutually aligned when the split ring 30 is in the compressed state illustrated in FIGS. 6 and 7, wherein a pin 32 is shown positioned within both bores 30d and 30e to lock the split ring in the compressed state. When the pin 32 is removed the split ring 30 expands, with the two leaves 30b and 30c sliding over each other and separating to reduced overlapping as indicated in FIGS. 5 and 8. The two leaf bores 30d and 30e also separate in the expanded state, as is also shown in FIG. 8. It will be appreciated that the diameter, or breadth, of the split ring 30 is larger in the expanded state of FIGS. 5 and 8 than is the case in the compressed state of FIGS. 6 and 7.

FIG. 6 shows a portion of the split ring seal 30 carried by a packing tray 34 having a structured peripheral edge ring 36 that provides a groove 38 in which the split ring is mounted. It will be appreciated that the split ring seal 30 may be flexed to separate at its structured split 30a along its axis to form a helix, and then threaded into the groove 38. The width of the groove 38 is such that the top and bottom edges of the split ring 30 fit against the inner surfaces of the top and bottom of the groove, as shown in FIGS. 6-9. In FIGS. 6 and 7 the split ring 30 is held in its compressed state by the pin 32 residing in the bores 30d and 30e. The tray 34 is thus positioned within a process tower wall 40. The dimensions of the packing tray 34, the split ring 30 and the tower wall 40 are such that the packing tray carrying the split ring in the groove 38 in the expanded state of FIG. 5 would not fit within the inner surface of the tower wall. When the spilt ring 30 is compressed within the groove 38 the packing tray can be inserted into the tower 40.

After the packing tray 34 and split ring seal 30 are in position within the tower wall 40, the pin 32 is pulled out of the bores 30d and 30e and the split ring expands to contact the tower wall and provide a seal between the tower wall and the packing tray, as shown in FIGS. 8 and 9. As noted above, the top and bottom of the split ring 30 engage the inner surfaces of the top and bottom of the groove 38, respectively, in both the compressed state of FIGS. 6 and 7 and the expanded state of FIGS. 8 and 9. It will be appreciated that the inner diameter of the tower wall 40 is such that the split ring 30 does not expand within the tower wall to the extent that the split ring would expand outside the tower wall as shown in FIG. 5; that is, in the expanded state of FIGS. 8 and 9 the resiliency of the split ring causes the split ring to press against the inner surface of the tower wall to effect a metal-to-metal seal with the wall at the same time that a metal-to-metal seal is maintained between the split ring and the inner surfaces of the top and bottom of the packing tray groove 38. Thus, the split ring 30 provides a seal between the packing tray 34 and the tower wall 40.

Figure 12:
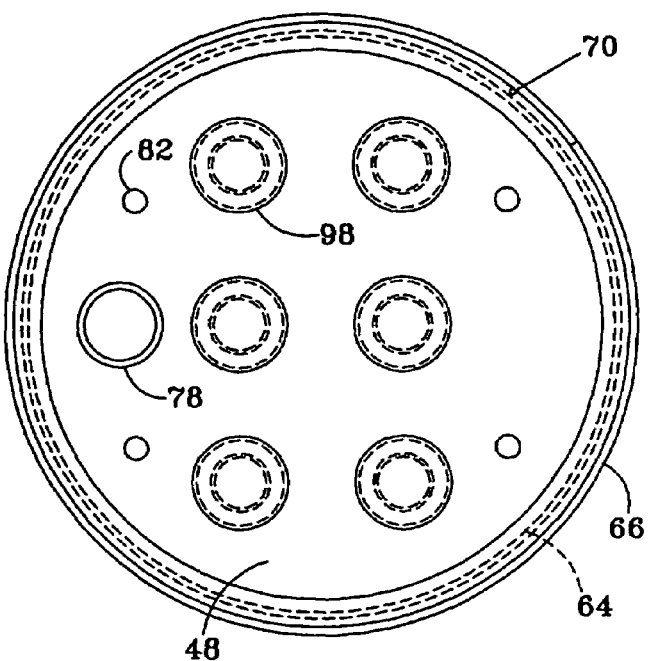
FIG. 12 is a plan view of a bubble tray equipped with a split ring seal of the present invention, constrained in a compressed state by a locking pin.
Figure 13:
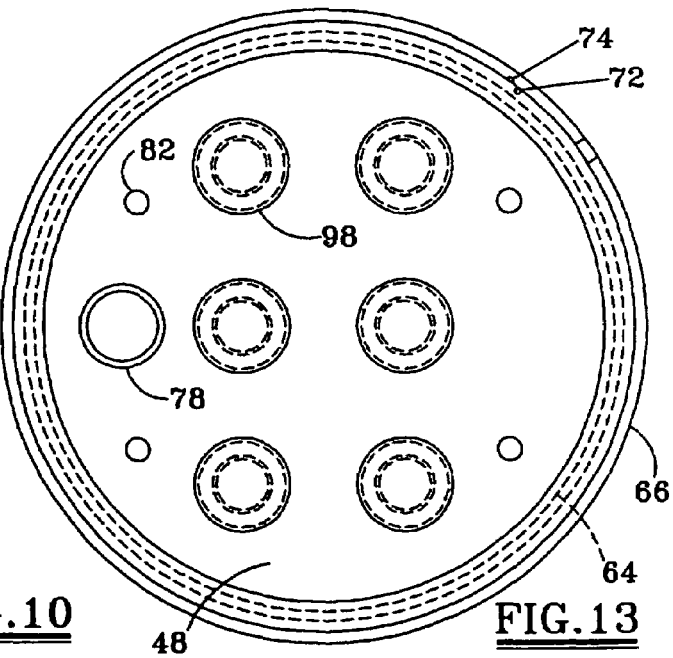
FIG. 13 is a view similar to FIG. 12, but with the locking pin removed and the split ring seal expanded.

The split ring seal 30 according the present invention is readily employed in a package, or cartridge, of packing trays, wherein multiple packing trays are assembled in a unit, and with a single pin being used to constrain all of the split ring seals compressed for insertion of the trays into a process tower. Two packing tray cartridges, using the split ring of the present invention, are illustrated generally at 42 and 44, respectively, in FIG. 10, positioned within a process tower 46. The lower packing tray cartridge 44 includes four packing trays in the form of bubble trays 48, 50, 52 and 54, in a vertical array. The upper packing tray cartridge 42 includes a single bubble tray 56 at the bottom of the cartridge, and an array of three packing trays in the form of perforated plates 58, 60 and 62 above the bubble tray 56. Details of the construction of the bubble trays 48-56 are not essential to the present invention; the split ring of the present invention may be utilized with any type of packing tray that benefits from sealing the periphery of the tray to the inner surface of the process tower wall. Use of the split ring on the trays 48-56 may be further appreciated by reference to FIGS. 11-13, each of the trays being of like construction. FIG. 11 shows trays 48 and 50; FIGS. 12 and 13 show tray 48. The trays 48-56 are disclosed herein by a discussion of some details of tray 48 in view of the similarities of all of these trays.

As shown in FIGS. 11-13, tray 48 is in the general form of a cylindrical basin having a structured periphery around the open top of the basin. The structured periphery includes a double flange defining a radially outwardly-facing groove 64 that receives a split ring seal 66 according to the present invention. A radial flange 68 is formed at the bottom of the tray 48. An elongate pin 70 passes through a hole 72 in the double flange 64 (FIGS. 11 and 12) and a bore 74 comprising two bores (not discernible) through the leaves of the structured split area of the ring seal 66 (FIGS. 11 and 13), and a hole (not visible) in the lower tray flange 68. The pin 70 is so inserted in place with the split ring seal 66 compressed within the groove 64, and thus locks the split ring seal in the compressed state. Again, it will be appreciated that the split ring seal 66 may be flexed to separate at its structured split along its axis to form a helix, and then threaded into the groove 64. All of the split ring seals are thus mounted in and compressed within the respective grooves on each of the trays 48-54 in the cartridge 44 and the pin 70 is so inserted into all of the compressed split ring seals to lock the seals in the retracted configuration. The cartridge 44 is then lowered into place within the process tower 46. A pin 76 is similarly used to lock the split ring seal of the tray 56 of the upper cartridge 42 in the compressed configuration.

Each of the trays 48-54 includes a downcomer 78 that rises above the bottom of the tray and extends downwardly into the basin of the tray immediately below, the downcomer 80 of the lowermost tray 54 ending in a curve that may include a vapor trap to prevent gas passing upwardly through the downcomer 80. The bottom of each of the trays 48-56 includes four holes 82. The trays 48-54 are held mutually spaced apart in lower cartridge 44 by spacer tubes 86. Four rods 88 pass through the tray holes 82 and the spacer tubes 86 which are positioned between adjacent trays 48-54 and which are too wide to pass through the tray holes 82. Connector bars 90 and 92 are positioned at the top and bottom, respectively, of the lower cartridge 44, and are broken by holes (not visible) through which the rods 88 pass. The ends of spacer tubes 86 also butt against the connector bars 90 and 92. Nuts 94 are threaded onto the ends of the four rods 88 at the top and the bottom of the cartridge 44, enclosing the trays 48-54, the spacer tubes 86 and the connector bars 90 and 92. In this way, the cartridge 44 is held together as a unit. Support lugs 96 are positioned at the bottom of the lower cartridge 44 for use in positioning the cartridge within the process tower 46. Each of the bubble trays 48-56 includes an array of six bubble caps 98 as indicated in FIGS. 11-13.

Figure 10:
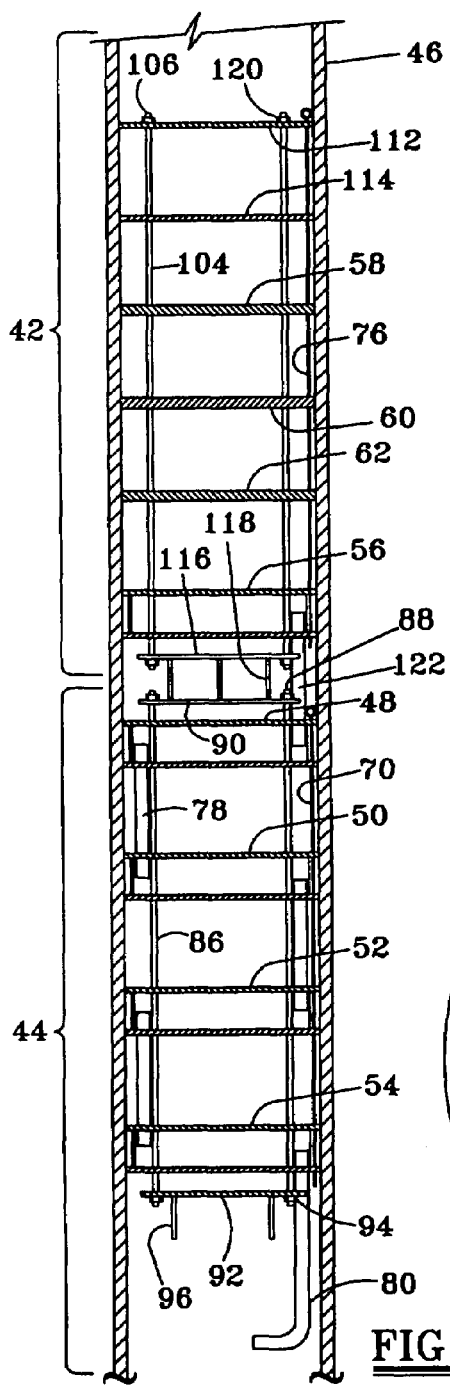
FIG. 10 is a side elevation, partly schematic, of a pair of packing tray cartridges including one or more bubble trays equipped with the split ring seals of the present invention, positioned within a process tower, with locking pins retaining the split ring seals compressed.

Details of the perforated plates 58-62 may be further appreciated by reference to FIG. 14 wherein the top perforated plate 58 is illustrated, the remaining perforated plates 60 and 62 being similar in construction. Each of the perforated plats 58-62 is broken by an array of holes 100 forming a sieve that allows liquid to drip through the plate and gas to pass upwardly through the plate. Further, four holes 102 are spaced around each of the perforated plates 58-62. The plates 58-62 and the tray 56 are held mutually spaced apart in the upper cartridge 42 by spacer tubes 104. Four rods 106 pass through the plate holes 102, the holes 82 in the tray 56, and the spacer tubes 104 that are positioned between adjacent plates 58-62 and the tray 56, and which are too wide to pass through the holes 82 and 102. Each plate 58-62 further includes a hole 108 positioned near the edge of the plate to receive the elongate pin 76 which is used to lock the split ring seal carried by the packing tray 56 near the bottom of the upper cartridge 42. A pair of crossbars 112 extends across the top of the upper cartridge 42, and a second pair of crossbars 114 is positioned between the top crossbars 112 and the top perforated plate 58. Connector bars 116 are located at the bottom of the upper cartridge 42, and support lugs 118 extend down from the connector bars 116. Each of the crossbars 112 and 116, and the connector bars 116 are broken by holes (not visible) through which the rods 106 pass. The ends of spacer tubes 104 also butt against the crossbars 112 and 114, and the crossbars 116. Nuts 120 are threaded onto the ends of the four rods 106 at the top and the bottom of the cartridge 42, enclosing the plates 58-62, the tray 56, the spacer tubes 104, the crossbars 112 and 114, and the connector bars 116. In this way, the cartridge 42 is held together as a unit. A downcomer 122 extends downwardly from the tray 56 at the bottom of the cartridge 42 to be received by the upper tray 48 of the lower cartridge 44 when the two cartridges are both positioned within the tower 46, as shown in FIG. 10.

The cartridges 42 and 44 may be installed in the process tower 46 as follows. With the trays 48-54 and the connector bars 90 and 92 assembled on the rods 88, separated by the spacer tubes 86, the nuts 94 are used to secure the rods to lock the parts of the lower cartridge 44 together. The split ring seals carried by the trays 48-54 are compressed and the pin 70 is passed through the respective holes in the trays and the seal rings. The lower cartridge 44 is then inserted into the process tower 46, with the support lugs 96 resting on the bottom of the tower or on an appropriate support (not shown) within the tower. The pin 70 is withdrawn upwardly from the tower 46 to release all of the split ring seals carried by the trays 48-54, sealing those trays to the interior surface of the tower 46. FIG. 11 illustrates a stage of the withdrawal of the pin 70 from the lower cartridge 44. The pin 70 is shown withdrawn from the split ring seal 124 carried by the tray 50, with that seal expanded, but the pin is still locking the split ring seal 66 carried by the tray 48 in the compressed state. FIGS. 12 and 13 illustrate tray 48 with the split ring seal 66 locked by the pin 70 in the compressed state (FIG. 12), and with the pin removed and the split ring seal expanded (FIG. 13).

The upper cartridge 42 is assembled in a similar manner. With the plates 58-62, the tray 56, the crossbars 112 and 114, and the connector bars 116 assembled on the rods 106, separated by the spacer tubes 104, the nuts 120 are used to secure the rods to lock the parts of the upper cartridge 42 together. The split ring seal carried by the tray 56 is compressed and the pin 76 is passed through the respective holes in the plates 58-62, the tray 56 and the split ring seal. The upper cartridge 42 is then inserted into the process tower 46, with the support lugs 116 resting on the connector bars 90 of the lower cartridge 44. The pin 76 is withdrawn upwardly from the tower 46 to release the split ring seal carried by the tray 56, sealing that tray to the interior surface of the tower 46. Both pins 70 and 76 are provided with a loop at the top end by which a line or other device, as needed, may be used to withdraw the pin upwardly from the tower 46.

It will be appreciated that a split ring seal according to the present invention may be used in a single application, on a single device, or on multiple devices that are assembled together in a unit. Within a packing cartridge any number of packing devices may carry the split ring seal of the present invention and may be mixed with devices not carrying the seal. Further, use of the split ring seal of the present invention allows insertion of one or more devices carrying the seal locked by a pin in the compressed state to be inserted in a process chamber, for example, without the seal interacting with protrusions or other unevenness on the interior surface of the chamber, after which the seal may be released to expanded and sealingly engage the interior surface of the chamber by the removal of the locking pin. Finally, in a particular application the locking pin may engage the split ring seal beyond the outer extent of the device carrying the seal, and may also bypass other devices, such as the perforated plates illustrated herein.

The foregoing disclosure and description of the invention is illustrative and explanatory thereof, and various changes in the method steps as well as the details of the apparatus may be made within the scope of the appended claims without departing from the spirit of the invention.

What is claimed is:

1. A split ring seal comprising a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned whereby a pin may be selectively inserted through the first and second bores to lock the ring in the compressed state, and selectively removed from at least one of the first and second bores to allow the ring to expand.

2. A split ring seal comprising a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned, and a pin that is selectively receivable within the first and second bores mutually aligned in the compressed state to lock the ring in the compressed state, and is selectively removable from at least one of the first and second bores to allow the ring to expand.

3. A packing tray, for use in a process chamber wherein a gas flows generally upwardly and a liquid flows generally downwardly and wherein the gas and the liquid may interact, carrying a split ring seal in a radially outwardly-facing groove for sealing the packing tray to an interior surface of the process chamber, wherein the improvement comprises:
  a. the split ring seal being a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned; and
  b. a pin that is selectively receivable within the first and second bores mutually aligned in the compressed state of the split ring seal to lock the ring in the compressed state, and is selectively removable to allow the ring to expand.

4. Apparatus, for use in a process chamber wherein a gas flows generally upwardly and a liquid flows generally downwardly and wherein the gas and the liquid may interact, including multiple packing trays joined together in a cartridge with one or more of the packing trays carrying a split ring seal in a radially outwardly-facing groove for sealing the packing tray to an interior surface of the process chamber, wherein the improvement comprises:
  a. each such split ring seal being a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned; and
  b. a pin that is selectively receivable within the first and second bores mutually aligned in the compressed state of each such split ring seal to lock the ring in the compressed state, and is selectively removable to allow the ring to expand.

5. Apparatus, for use in a process chamber wherein a gas flows generally upwardly and a liquid flows generally downwardly and wherein the gas and the liquid may interact, including multiple cartridges with each cartridge being formed with multiple packing trays joined together in an array with one or more of the packing trays in each cartridge carrying a split ring seal in a radially outwardly-facing groove for sealing the packing tray to an interior surface of the process chamber, wherein the improvement comprises:
   a. each such split ring seal being a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned; and
   b. for each cartridge, a pin that is selectively receivable within the first and second bores mutually aligned in the compressed state of each such split ring seal in the cartridge to lock the ring in the compressed state, and is selectively removable to allow the ring to expand.

6. A method of installing a packing tray in a process chamber, wherein a gas flows generally upwardly and a liquid flows generally downwardly and wherein the gas and the liquid may interact, the packing tray carrying a split ring seal in a radially outwardly-facing groove for sealing the packing tray to an interior surface of the process chamber, wherein the improvement comprises the following steps:
   a. providing the split ring seal as a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned;
   b. providing a pin that is selectively receivable within the first and second bores mutually aligned in the compressed state of the split ring seal to lock the ring in the compressed state, and is selectively removable to allow the ring to expand;
   c. moving the split ring seal to its compressed state and inserting the pin into the mutually aligned first and second bores of the split ring seal;
   d. inserting the packing tray into position within the process chamber; and
   e. removing the pin from at least one of the first and second bores of the split ring seal to allow the split ring seal to expand and seal to the interior surface of the process chamber.

7. A method of installing apparatus in a process chamber, wherein a gas flows generally upwardly and a liquid flows generally downwardly and wherein the gas and the liquid may interact, the apparatus including multiple packing trays joined together in a cartridge with one or more of the packing trays carrying a split ring seal in a radially outwardly-facing groove for sealing the packing tray to an interior surface of the process chamber, wherein the improvement comprises the following steps:
   a. providing each such split ring seal as a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned;
   b. providing a pin that is selectively receivable within the first and second bores mutually aligned in the compressed state of each such split ring seal to lock the ring in the compressed state, and is selectively removable to allow the ring to expand;
   c. moving each such split ring seal to its compressed state and inserting the pin into the mutually aligned first and second bores of each such split ring seal;
   d. inserting the cartridge into position within the process chamber; and
   e. removing the pin from the first and second bores of each such split ring seal to allow the split ring seal to expand and seal to the interior surface of the process chamber.

8. A method of installing apparatus in a process chamber, wherein a gas flows generally upwardly and a liquid flows generally downwardly and wherein the gas and the liquid may interact, the apparatus including multiple cartridges with each cartridge being formed with multiple packing trays joined together in an array with one or more of the packing trays in each cartridge carrying a split ring seal in a radially outwardly-facing groove for sealing the packing tray to an interior surface of the process chamber, wherein the improvement comprises the following steps:
   a. providing each such split ring seal as a metal ring having a structured split formed with first and second overlapping leaves, the ring being movable between a compressed state in which the first and second leaves are retracted to increased mutual overlapping, and an expanded state in which the first and second leaves are less overlapped, the outer circumference of the ring being greater in the expanded state than in the compressed state, a first bore through the first leaf and a second bore through the second leaf such that, in the compressed state, the first and second bores are mutually aligned;
   b. providing a pin for each cartridge wherein the pin is selectively receivable within the first and second bores mutually aligned in the compressed state of each such split ring seal in the respective cartridge to lock the ring in the compressed state, and is selectively removable to allow the ring to expand; and
   c. for each cartridge:
      i. moving each such split ring seal to its compressed state and inserting the respective pin into the mutually aligned first and second bores of each such split ring seal;
      ii. inserting the cartridge into position within the process chamber; and
      iii. removing the pin from the first and second bores of each such split ring seal to allow the split ring seal to expand and seal to the interior surface of the process chamber.

* * * * *